United States Patent [19]

Savage et al.

[11] Patent Number: 4,761,847
[45] Date of Patent: Aug. 9, 1988

[54] FOLDING RAMP

[76] Inventors: Carl P. Savage, 407 McGill St.; John E. Knight, Rte. 2, Box 164,, both of Martin, Tenn. 38237; J. W. Graves, Box 266, Springfield, Tenn. 37172; Harold Tate, Rte. 1, Cottontown, Tenn. 37048

[21] Appl. No.: 66,519

[22] Filed: Jun. 26, 1987

[51] Int. Cl.$^4$ .............................................. E01D 1/00
[52] U.S. Cl. ..................... 14/69.5; 182/218; 182/223; 108/112; 414/537; 52/226; 52/228; 52/645
[58] Field of Search ................... 14/69.5, 72.5; 254/88; 193/38, 41; 182/218, 223; 108/112, 113; 414/537; 52/226, 228, 645, 646

[56] References Cited

U.S. PATENT DOCUMENTS

| 963,918 | 7/1910 | Miller | 14/69.5 |
|---|---|---|---|
| 1,115,775 | 11/1914 | Bisbach | 14/69.5 X |
| 1,232,437 | 7/1917 | Simpson | 14/69.5 |
| 1,568,303 | 1/1926 | Webster | 14/69.5 |
| 2,415,461 | 2/1947 | Causey | 182/218 X |
| 2,624,058 | 1/1953 | Kudrna | 14/69.5 |
| 2,635,889 | 4/1953 | Concello | 14/72.5 X |
| 3,106,826 | 10/1963 | Freidel et al. | 14/69.5 |
| 3,818,528 | 6/1974 | Petersen | 14/69.5 |
| 3,936,898 | 2/1976 | Poe | 14/69.5 |
| 3,976,209 | 8/1976 | Burton | 414/537 |
| 4,528,711 | 7/1985 | Packer | 14/69.5 |

FOREIGN PATENT DOCUMENTS

| 48142 | 5/1911 | Austria | 193/41 |
|---|---|---|---|
| 688285 | 3/1953 | United Kingdom | 14/69.5 |

Primary Examiner—Stephen J. Novosad
Assistant Examiner—John F. Letchford
Attorney, Agent, or Firm—Finnegan, Henderson, Farabow, Garrett & Dunner

[57] ABSTRACT

A portable folding ramp used for ascending or descending an object or platform. The ramp is comprised of a plurality of rectangular panels, respective ones of adjoining panels being pivotably hinged along adjacent sidewalls such that the ramp may be folded into a compact first state, or unfolded into a second state where the ramp may support a load. The ramp includes a cable and hinge system positioned on the underside of the panels to provide structural support to the ramp in the second state while allowing the panels to be folded into the compact first state.

13 Claims, 7 Drawing Sheets

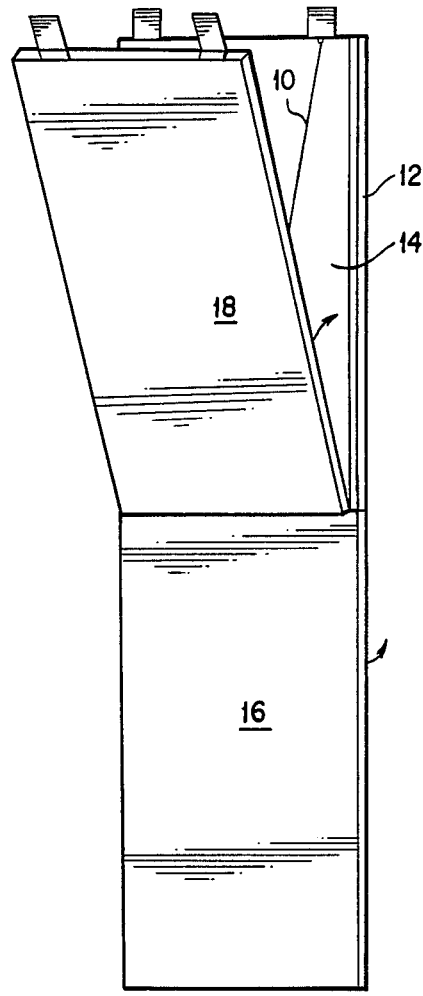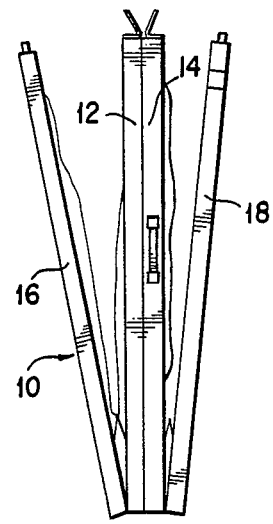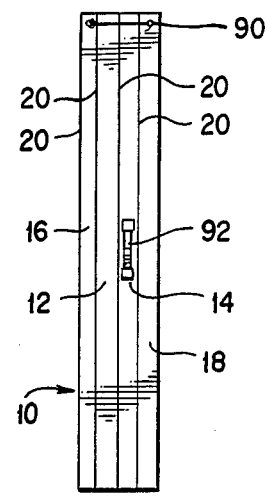

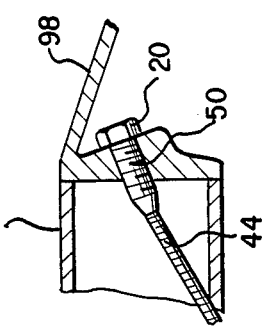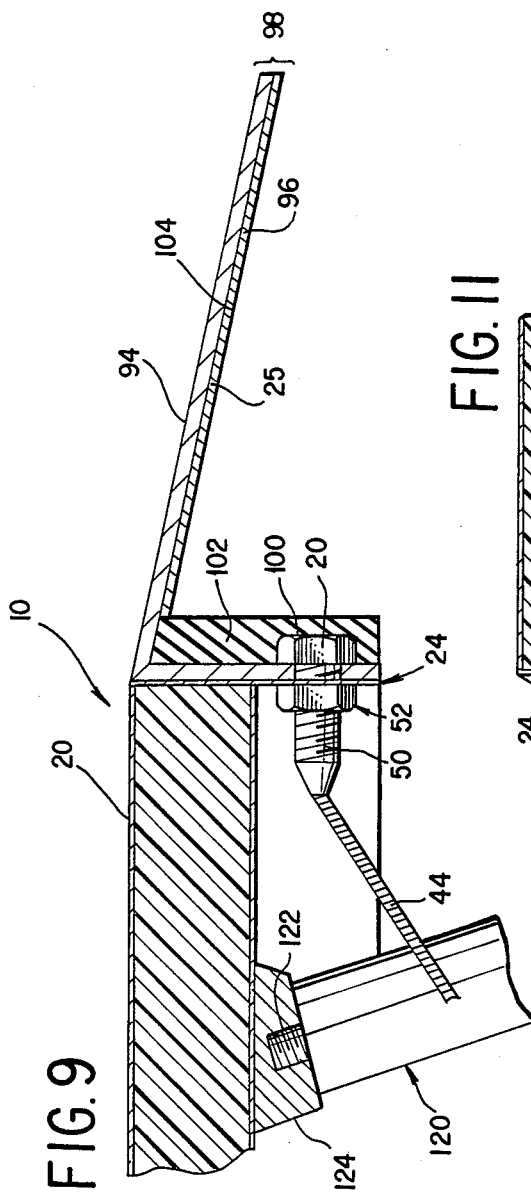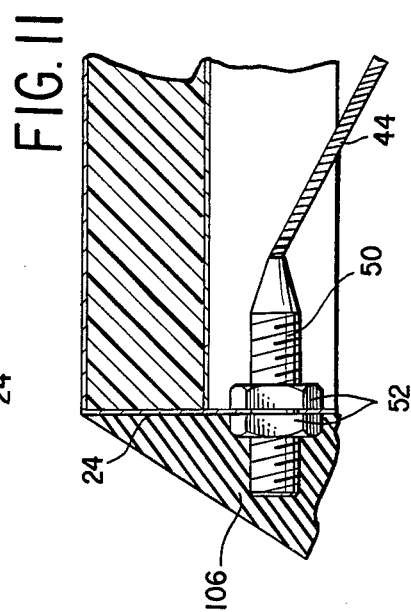

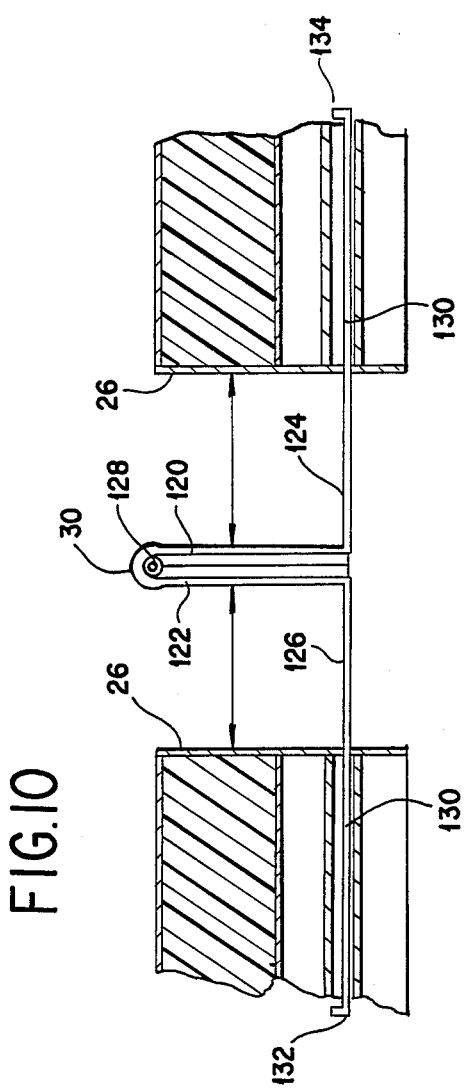

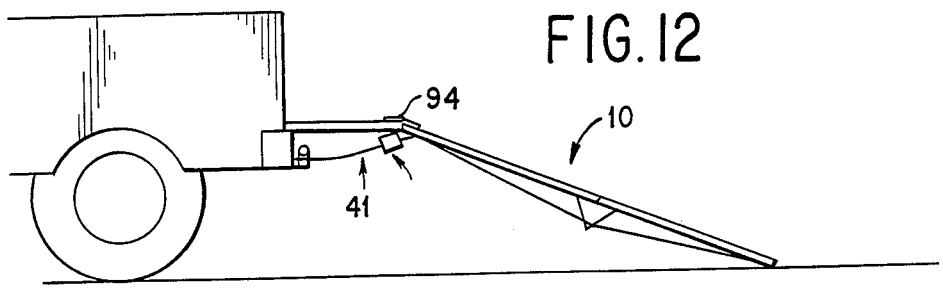
FIG. 12
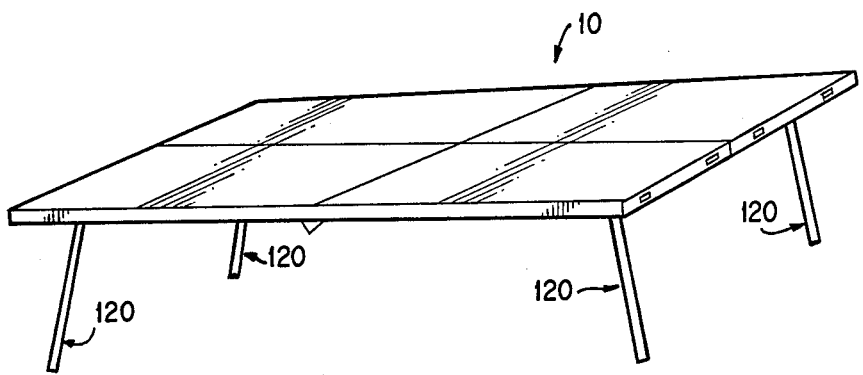
FIG. 13
FIG. 14
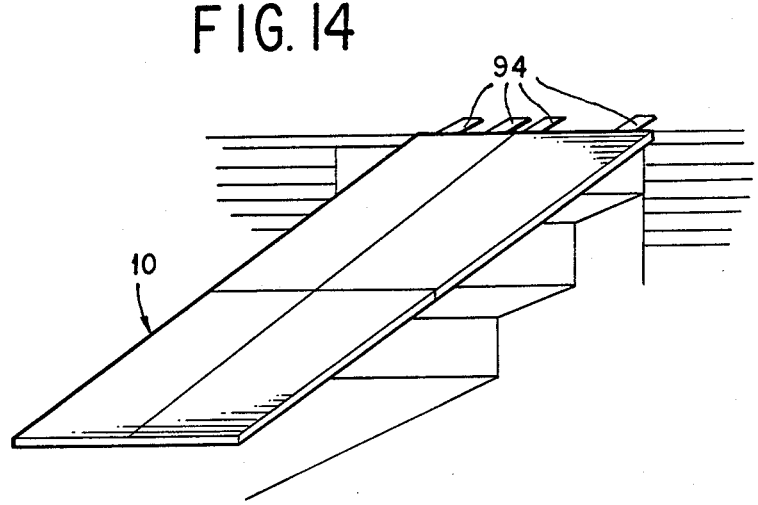

FOLDING RAMP

BACKGROUND OF THE INVENTION

1. Field of the Invention

The instant invention relates in general to ramps used for ascending and descending an object or platform and more particularly to a ramp which is lightweight and foldable for ease in transportation and storage.

2. Description of the Related Art

The loading and unloading of utility off-the-road vehicles, lawn and garden equipment, and other apparatus into trucks or vans has presented a problem for some time. Many alternatives have been proposed for addressing this need. Unfortunately, the proposed solutions usually involve ramps which are permanently or semipermanently attached to the truck or van and hence not portable. These prior art ramps are unnecessarily heavy resulting in reduced gas mileage of the truck or van and difficulty in positioning the ramp for use. Further, many of the prior art ramps are bulky resulting in great difficulty in handling and storing the ramp.

One example of such a prior art ramp is disclosed in U.S. Pat. No. 3,976,209. That ramp utilizes a plurality of pivotable legs to directly support a folding hinge. The legs provide structural support for the ramp without the requirement of a vertical ramp to ground support. However, the legs are rigid and cannot be adjusted to carry varying weight loads. A further example of a prior art ramp is discussed in U.S. Pat. No. 1,115,775. This ramp includes a vertical support member at the hinge. However, the support member is rigid which precludes folding the ramp into a compact state. Additionally, the support rather, it simply connects the two plank members forming the ramp.

Known prior art ramps which are foldable, only hinge in one direction, and therefore the compactness of the ramps is limited. Furthermore, no prior art ramps are known which are adjustable to limited in the size and type of objects which can be ascended with the ramp.

Moreover, none of the known prior art ramps are light enough to be easily transported, hence alternate uses for the ramp are limited.

It is an object of the present invention to provide a portable, lightweight, and compact ramp for loading or unloading utility vehicles or other objects into or out of a truck, car, van or other vehicle.

It is a further object of the invention to provide a lightweight ramp which is foldable in more than one direction to make the ramp more compact for storage and transportation and to provide adjustability of the lateral dimension of the ramp so as to accomodate varying sizes of objects or platforms which are to be ascended.

It is still a further object of the present invention to provide a lightweight, compact ramp having a load support system which can be selectively adjusted to accomodate varying loads placed on the ramp.

It is still a further object of the present invention to provide a lightweight, compact ramp which is easily transported and handled so that the ramp may be used for a multiplicity of purposes.

It is still a further object of the invention to provide a portable, lightweight ramp having an internal load supporting mechanism which does not require contact with the ground to provide support to the ramp.

Additional objects and advantages of the invention will be set forth in the description which follows and in part will be obvious from the description or may be learned by practice of the invention. The objects and advantages of the invention may be realized and attained by means of the instrumentalities and combinations particularly pointed out in the appended claims.

SUMMARY OF THE INVENTION

To achieve the foregoing objects and in accordance with the purposes of the invention as embodied and broadly described herein, a portable folding ramp is provided comprising a plurality of panels, each panel having a top and bottom surface and longitudinal and lateral sidewalls. The ramp further includes longitudinal and lateral hinge means for foldably connecting selected ones of the panels along adjacent sidewalls to allow the ramp to be folded into a first state wherein the top surfaces of the panels are substantially parallel one another and the ramp is compact and easily transported and to be unfolded into a second state wherein the top surfaces of the panels are substantially co-planar with respect to one another and the ramp is a load-bearing member.

The folding ramp further comprises at least one support bracket for providing transverse support to the ramp in the second, unfolded state. The support bracket means includes a first and second member each having a proximate end pivotably supported at the bottom surface of selected ones of the panels across the lateral hinge means. The members are further pivotably connected to one another at the distal ends thereof to allow the members of the bracket to be folded upon one another about the lateral hinge means. The ramp further includes at least one flexible support cable attached at opposite ends of adjoining panels and extending across the lateral hinge means through apertures in each member of the support bracket means. The cable acts to support, in combination with the support bracket means, the ramp in the second, unfolded state and to relieve stresses at the lateral hinge means.

Preferably the folding ramp also includes means for selectively adjusting the lateral dimension of the ramp in the second state.

It is still further preferable that the ramp include mean for selectively adjusting the tension in the support cable.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

FIG. 3 illustrates the ramp of FIG. 1 folded into a first state;

FIGS. 5-8 show the sequential operation of the folding ramp of FIG. 1 into the small, portable, and compact unit illustrated in FIG. 3;

FIG. 9 illustrates the flange portion of the ramp used for supporting the ramp on the platform to be ascended, and a first embodiment of the support legs which may be affixed to the ramp;

FIG. 9A illustrates the flange portion with the aperture for receiving the threaded bolt inclined relative to the top surface of the ramp;

FIG. 10 illustrates an adjustable hinging mechanism used with a preferred embodiment of the present invention;

FIG. 11 illustrates an adjustable tensioning mechanism which may be provided with the cable support of FIG. 1 to selectively adjust the tension in the cable;

FIG. 12 is a depiction of a preferred embodiment of a ramp according to the present invention as it is used with a truck;

FIG. 13 is a depiction of still another embodiment of a ramp according to the instant invention wherein the ramp includes a plurality of legs for supporting the ramp in a horizontal position where it may be used as a table; and FIG. 14 illustrates the ramp of FIG. 1 utilized as a ramp for ascending stairs to enable a wheelchair or the like to ascend or descend the stairs.

DETAILED DESCRIPTION OF THE PREFERRED EMBODIMENT OF THE INVENTION

Reference will now be made in detail to the present preferred embodiment of the invention as illustrated in the accompanying drawings.

Figure 1:
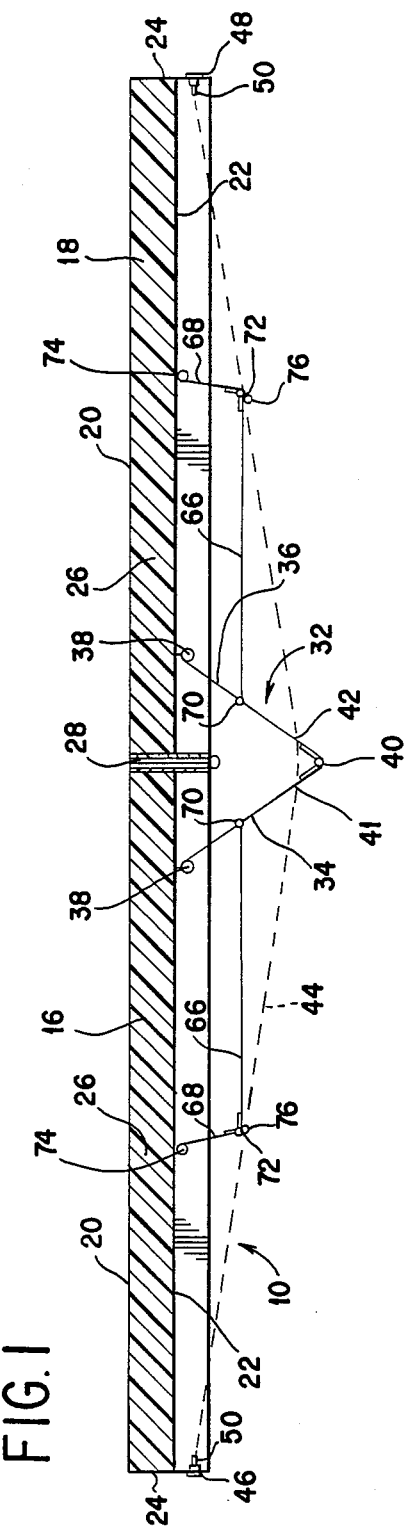
FIG. 1 is a side view of a ramp configured in accordance with a preferred embodiment of the instant invention.
Figure 2:
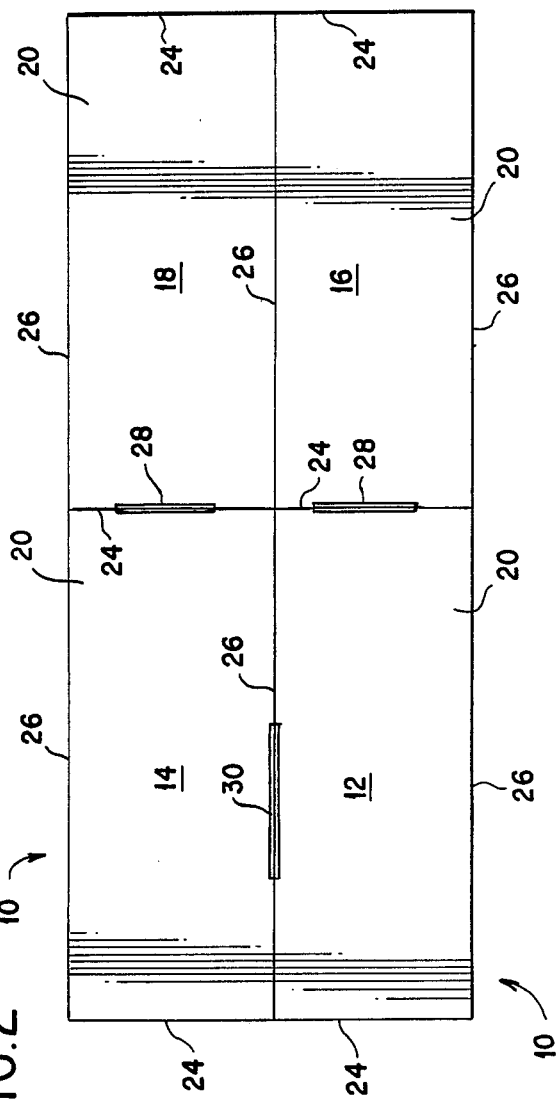
FIG. 2 is a top view of the ramp of FIG. 1.

FIGS. 1 and 2 illustrate, respectively, a side view and a top view of a preferred embodiment of the ramp of the instant invention. The ramp is generally referred to by the numeral 10 and includes a plurality of panels 12, 14, 16, and 18, each of the panels having a top surface 20, a bottom surface 22, lateral sidewalls 24, and longitudinal sidewalls 26.

The ramp as embodied in FIGS. 1 and 2 includes longitudinal and lateral hinge means for foldably connecting the adjoining panels along adjacent respective longitudinal and lateral sidewalls. As embodied herein, the longitudinal and lateral hinge means includes lateral hinges 28 and longitudinal hinge 30.

Figure 5:
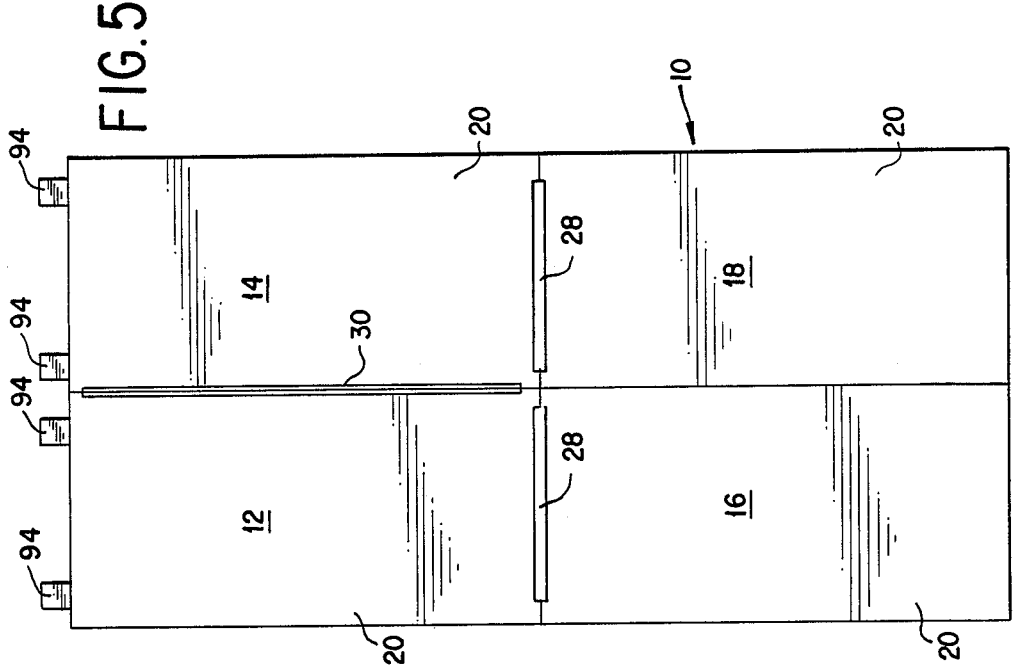

With reference to FIGS. 3 and 5, the panels 12, 14, 16, and 18 are foldable about lateral hinges 28 and longitudinal hinge 30 into a first state (FIG. 3) wherein the top surfaces 20 of the panels are substantially parallel with respect to one another and are unfoldable about lateral hinge 28 and longitudinal hinge 30 into a second state (FIG. 5) wherein top surfaces 20 of the panels are substantially coplanar with respect to one another.

With continued reference to FIG. 1, the ramp 10 further includes at least one support bracket 32 having first and second rigid members 34 and 36. The proximate ends of each rigid member 34 and 36 is pivotably connected at 38 on opposite sides of lateral hinge means 28 to the bottom surfaces 22 of respective panels. Preferably, a support bracket 32 is provided across each lateral hinge 28. For example, in the preferred embodiment illustrated in FIG. 1, a second support bracket (not shown) is provided across the second lateral hinge 28 connecting panels 12 and 14. The distal ends of first and second rigid members 34 and 36 of support bracket 32 are pivotably connected to one another at 40 across and spaced apart from lateral hinge 28. First and second rigid members 34 and 36 have apertures 41 and 42, respectively, at a predetermined distance from the pivotable connection 40. Details of the support bracket are discussed below with reference to FIG. 4.

The panels used with the ramp may be constructed of thin sheets of aluminum or other light weight metal or materials, such as wood or plastic, which are glued or mechanically attached to a superstructure of suitable strength such as plastic, foam material, or any other suitable composite material. Preferably, top surfaces 20 of each panel are configured with a non-skid surface. The exact nature of the materials forming the panels of the ramp are not limited by the invention, and one skilled in the art could quickly recognize a variety of materials which may be appropriate for use with the instant invention.

The preferred embodiment illustrated in FIGS. 1 and 2 further includes at least one flexible support cable 44 which is inserted through the apertures 41 and 42 of first and second rigid members 34 and 36. Cable 44 is attached at opposite ends to adjoining panels at connections 46 and 48. Each connection 46 and 48 includes means for attaching cable 44 at opposite ends of adjoining panels across lateral hinge 28. By way of example and not limitation, and as embodied here, the means for attaching the cable at connections 46 and 48 includes a threaded bolt 50 provided on each end of cable 44 and a nut 52. The cable is connected to the bolts 50 by swaging, for example. As shown in FIG. 11, nut 52 is fastened, by welding, for example, to the lateral sidewalls 24 at opposite ends of adjoining panels.

With continued reference to FIG. 1 and FIG. 2, when a load is placed on top surfaces 20 of panels 12-18, cable 44 threaded through apertures 41 and 42 of rigid members 34 and 36 of support bracket 32 acts to urge spaced pivotable connection 40 in a first direction which opposes the direction of the load placed on top surfaces 20 of the panel. In this manner, support brackets 32 and cable 44 absorb the stress on hinges 28 applied by a load on top surfaces 20 of the panels. Thus, the support bracket 32 and cable 44, in combination, serve to relieve stresses on hinge 28 while absorbing a load placed on top surfaces 20 of the panels. Moreover, the support bracket and cable mechanism does not require any contact with the ground to provide the load bearing support. Thus, as a load is applied to the surface 20 of panels 12, 14, 16, and 18, vertical support is provided by transferring the stress of the load on top surfaces 20 to the ends of adjoining panels through cable 44 and threaded bolt 50. In this manner, cable 44 and support bracket 32 provide a swinging bridge support for the truss configured by rigid members 34 and 36.

With reference to FIG. 12, ramp 10 preferably includes a means for securing the ramp to an object or platform to be ascended with the ramp. As embodied herein and shown in FIG. 12, the securing means includes a chain 41 fixedly attached at one end to a selected panel and attachable at the other end to the object or platform to be ascended. By way of example and not limitation, in FIG. 12 the chain 41 is attached to a trailer hitch of a pick-up truck.

Figure 4:
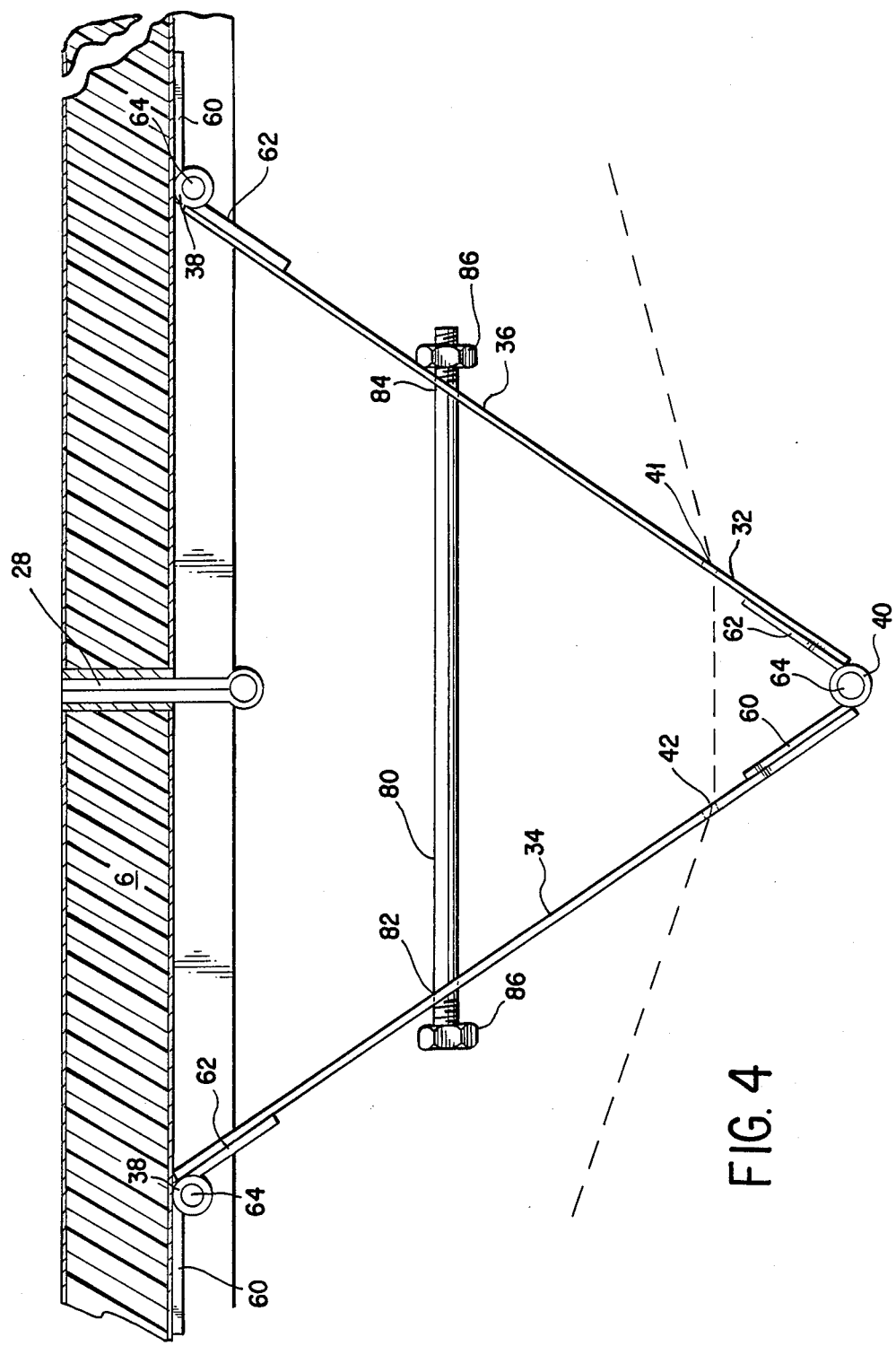
FIG. 4 is a side view of the support bracket used with the preferred embodiment of the invention.

FIG. 4 illustrates a detailed view of support bracket 32. Pivotable connections 38 and 40 of first and second rigid members 34 and 36 comprise a pivotable hinge having extension members 60 and 62 and a rod or pin 64 about which members 60 and 62 rotate. Member 60 of each pivotable connection 38 is secured to bottom surface 22 of adjoining panels on opposite sides of lateral hinge 28. Extension members 60 may be attached to bottom surface 22 of a respective panel by welding, or by an adhesive, or by any other means well known in the art for affixing flat surfaces to one another. Extension member 62 of each pivotable connection 38 is likewise attached to a respective first or second rigid member 34 or 36 of support bracket 32 by means of welding, adhesive or any other attachment means well known in the art. Members 60 and 62 of pivotable connection 40 are secured at the opposite end of each rigid member 34 and 36, again by means of welding, adhesive or any other well known means of attachment.

With continued reference to FIG. 4, support bracket 32 is foldable onto itself as adjoining panels connected by lateral hinge 28 are folded onto one another. Thus, the support bracket is made to lie flat with rigid members 34 and 36 lying substantially parallel to one another with respect to bottom surface 22 of respective panels when the panels are folded onto one another about lateral hinge 28. This configuration provides for a compact first state of the ramp so that the ramp is easily transported and stored in said first state.

As described herein, support bracket 32 and cable 44 provide a novel lightweight inverted bridge type support which relieves stress from lateral hinge 28. However, the configuration of support bracket 32 is not limited to the embodiment shown in FIGS. 1 and 4. For instance, the support bracket 32 may be configured of more than two rigid members interconnected to one another, or pivotable connections 38 and 40 may comprise any hinge type bracket well known to those skilled in the art.

With reference to FIG. 1, support bracket 32 may include additional support members comprised of support rods 66 and 68. Support rods 66 are pivotably connected at connections 70 to a respective first and second rigid member of support bracket 32. Rods 66 are pivotably connected at the other end thereof to rod members 68 at pivotable connections 72, respectively. Rod members 68 are then each pivotably connected, on opposite sides of lateral hinge 28, at the other end thereof to bottom surfaces 22 of adjoining panels at pivotable connections 74. Pivotable connections 70, 72, and 74 of rod members 66 and 68 may be formed by any type of hinge bracket or ball and socket connection well known in the art. Preferably, pivotable connections 72 are each provided with an eyelet guide 76 to guide and maintain cable 44 in the proper support positions when ramp 10 is in first folded state.

With reference to FIG. 4, additional support may be provided to support bracket 32 by inserting a rod 80, threaded at both ends, through apertures 82 and 84 in first rigid member 34 and second rigid member 36, respectively, and securing the rod 80 in apertures 82 and 84 with nuts 86 threaded on respective ends of rod 80.

Figure 6:
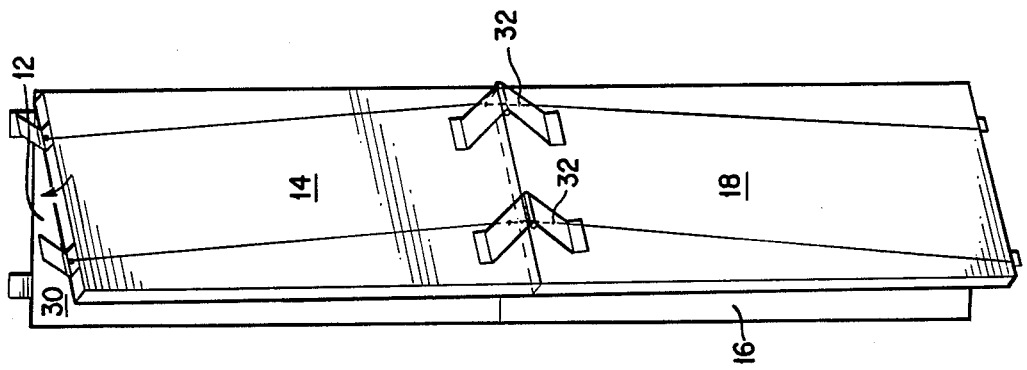

With reference to FIGS. 3, 5, 6, 7 and 8, folding of panels 12-18 into the first folded state will now be described. As shown in FIG. 5, ramp 10 is in the second state wherein top surfaces 20 of panels 12-18 are substantially co-planar. Panels 14 and 18 are then folded about longitudinal hinge 30 such that top surfaces 20 of panels 14 and 18 are adjacent and opposite to top surfaces 20 of panels 12 and 16, respectively., This relationship is shown in FIG. 6. With reference to FIG. 7, panel 18 is rotated about lateral hinge 28 in a first rotational direction such that bottom surfaces 22 of panels 18 and 14 opposedly face one another. Similarly, panel 16 is rotated in a second rotational direction, opposite the first rotational direction to bring bottom surfaces 22 of panels 16 and 12 into opposed relationship. This procedure is shown in FIG. 8 wherein it can further be seen that support brackets 32, positioned on opposite sides of lateral hinges 28 and connected at one end thereof to bottom surfaces 22 of adjoining panels, collapse on themselves to provide a compact configuration of panels 12-18 in the first folded state.

With reference to FIG. 3, with panels 12-18 in the first folded state, a latch 90 is provided to lock the panels in the first state, and a handle 92 is provided on one lateral sidewall of a selected panel to provide for ease of transportation and handling of the ramp in the first folded state.

With reference to FIGS. 5, 9, 9A, 12 and 14, ramp 10 preferably includes at least one flange portion 94, fixedly attached to lateral sidewall 24 at one end of ramp 10. Flange portion 94 extends a predetermined distance from top surface 20 of a respective panel. A bottom surface 96 of flange portion 94 rests on the surface of the platform to be ascended with ramp 10. Preferably, flange portion 94 has an aperture for receiving threaded bolt 50 and is secured to lateral sidewall 24 of the panel with a nut 100 which is threadably received on bolt 50 of cable 44. It is further preferable that flange portion 94 include a rubber bumber pad 102 which is also held in place by bolt 50 and nut 100. Rubber bumper pad 102 serves to protect the finish or surface of the platform to be ascended from scarring or scratching by ramp 10. Furthermore, flange portion 94 also preferably includes a thin protective covering 104 made of rubber or plastic, for example, which also acts to protect the surface or finish of the platform being ascended from scratching or scarring when extending portion 98 of flange portion 94 rests on the surface of the platform being ascended. By securing flange portion 94 to lateral sidewall 24 of a respective panel through bolt 50 and nut 20, a load force on top surface 22 of the panel is transferred via the bolt 50 and cable 44 to both ends of the ramp where cable 44 is attached. Thus, the flange end of the ramp is protected from deformation by torques applied to surfaces 20 of ramp 10. FIGS. 12 and 14 illustrate an embodiment of ramp 10 with support flanges 94 resting on a tailgate of a truck or on the top stair of a flight of stairs, respectively.

Preferably, ramp 10 includes means for adjusting the tension in cable 44 to accomodate varying loads on top surfaces 20 of panels 12-18. As embodied herein and illustrated in FIG. 11, the means for adjusting the tension in cable 44 includes nuts 52 provided on opposing sides of lateral sidewall 24 of a respective panel. To increase the tension in cable 44 the innermost nut 52 is tightened with a wrench to project threaded bolt 50 outwardly with respect to sidewall 24. When the proper tension is achieved in cable 44, the outermost nut 52 is tightened to abut the outside surface of lateral sidewall 24 of a respective panel, thus locking bolt 50 into place. Alternatively, the tension in cable 44 may be adjusted by means of a turn buckle mechanism configured on the cable proper or by a lever mechanism, each of which would be well known to one skilled in the art.

With continued reference to FIG. 11, a bumper 106 may be configured on the lateral sidewall of the panels which are to contact the ground or the surface from which the load will ascend the platform. Bumper 106 thus provides a slight incline to the beginning loading point of the ramp 10 and gives added protection against slippage when descending the ramp from the loading platform.

Preferably, the ramp in accordance with the instant invention includes means for selectively adjusting the lateral dimension of the ramp. As embodied herein and illustrated in FIG. 10, the adjusting means includes vertical portions 120 and 122 and horizontal portion 124 and 126 configured on longitudinal hinge 30. Vertical portions 122 and 120 are fixedly attached to sidewalls 26 of adjoining panels are each configured with a lateral slot 130 therein. Horizontal portions 124 and 126 of longitudinal hinge 30 fit within the slot portions 130 configured in longitudinal sidewalls 26. Horizontal members 126 and 124 each have a hook portion 132 and 134 at the distal ends. This configuration of longitudinal hinge 30 and longitudinal sidewalls 26 allows for the ramp to be adjusted in the lateral dimension when in the second, unfolded state by pulling apart respective panels such that horizontal portions 124 and 126 of longitudinal hinge 30 extend from slots 130. To fold the panels of the ramp into the first, folded state, respective panels are pushed together such that horizontal portions 126 and 124 of longitudinal hinge 30 are inserted into longitudinal grooves 130 until longitudinal sidewalls 26 are immediately adjacent vertical portions 120 and 122 of longitudinal hinge 30. At this time, the panels are folded one onto another about longitudinal hinge 30 as previously described.

It will be obvious to those skilled in the art that the present invention may be made with either an adjustable longitudinal hinge 30 or with a fixed longitudinal hinge. An adjustable longitudinal hinge would allow for varying the lateral dimension of the ramp to accomodate various size platforms which are to be ascended using the ramp.

With reference to FIGS. 9 and 13, the ramp constructed in accordance with the instant invention may also include a plurality of legs 120 attached to bottom surfaces 22 of respective panels. The legs may be pivotably attached to fold into and lie flat against bottom surfaces 22 with the ramp in the first, folded state, or the legs may be attached and detached by with a matching receptacle 124 formed on bottom surfaces 22 as shown in FIG. 9. With legs 120 in an extended position and positioned substantially horizontal with respect to the surface which the legs rest on, and the ramp may be utilized for a variety of purposes such as a picnic table or workbench.

The foregoing description of the instant invention relates to a preferred embodiment wherein only four panels comprise the ramp. The invention is not, however, limited to a ramp having only four panels and may be comprised of any number of panels wherein adjacent panels are hinged along adjoining lateral and longitudinal sidewalls such that the panels may be folded initially about the longitudinal hinges until the width of the ramp is equivalent to the width of a single panel, for example. Then, adjoining panels may be folded about lateral hinges configured on adjoining lateral sidewalls in opposite rotational directions until the first, folded state is achieved wherein the overall lateral and longitudinal dimensions of the ramp are equivalent to the lateral and longitudinal dimensions of a single panel. The additional depth created by having more than four panels may be accounted for by providing adjustable hinges as previously described on both the lateral and longitudinal hinges such that the width of the hinge portions allows for respective panels to be folded onto one another.

Additional advantages and modifications will readily occur to those skilled in the art. The invention in its broader aspects is, therefore, not limited to the specific details representative apparatus and illustrative examples shown and described. Accordingly, departures may be made from such details without departing from the spirit or scope of applicants' general inventive concepts.

What is claimed is:

1. A portable folding ramp, comprising:
    a plurality of panels, each said panel having a top and bottom surface and lateral and longitudinal sidewalls;
    longitudinal and lateral hinge means for foldably connecting adjoining panels along adjacent respective longitudinal and lateral sidewalls, said panels being foldable about said longitudinal and lateral hinge means into a first state wherein said top surfaces of said panels are substantially parallel with respect to one another, and being unfoldable about said longitudinal and lateral hinge means into a second state co-planar with respect to one another;
    at least one support bracket including first and second rigid members each having a proximate and a distal end, said proximate ends each pivotably connected on opposite sides of said lateral hinge means to said bottom surface of respective panels, said first and second rigid members being further pivotably connected to one another at said distal ends across and spaced from said lateral hinge means such that said members are foldable onto one another with said ramp in said first state, said first and second members each having an aperture at a predetermined distance from said pivotable, spaced connection;
    at least one flexible support cable inserted through said apertures in said first and second members of said support bracket and means for attaching said cable at opposite ends of adjoining panels across said lateral hinge means, said cable urging said spaced, pivotable connection of said first and second rigid members in a first direction with said panels in said second state to support a load on said top surfaces of said panels.

2. The portable folding ramp of claim 1, wherein said panels in said unfolded, second state comprise an array having lateral rows and longitudinal columns, said lateral hinge means being provided at each pair of adjacent lateral sidewalls of adjoining panels of said array, and said longitudinal hinge means being provided at adjacent longitudinal sidewalls of adjoining panels of one lateral row of said array such that adjoining panels having only lateral hinge means connected thereto are foldable in opposite rotational directions about each said lateral hinge means to bring said panels into said first, folded state wherein said top surfaces are substantially parallel.

3. The portable folding ramp of claim 2, wherein said support bracket and said flexible cable are provided across each said lateral hinge means.

4. The portable folding ramp of claim 1, wherein said means for attaching said cable at opposite ends of adjoining panels further includes a means for adjusting the tension in said cable with said panels in said second, unfolded state to support varying loads on said top surface of said panels.

5. The portable folding ramp of claim 4, wherein said means for adjusting the tension in said cable includes a threaded nut fixedly attached at said lateral sidewalls respective adjoining panels and a threaded bolt attached at each end of said cable, said bolts being adjustably engaged with said threaded nut.

6. The portable folding ramp of claim 1, including a means for locking said panels in said first, folded state thereby making said ramp easily transportable and storable in said second state.

7. The portable folding ramp of claim 6 including a handle positioned on said sidewall of a selected panel for lifting said ramp when in said first, folded state.

8. The portable folding ramp of claim 1, including means, fixedly attached to at least one said panel of said ramp, for securing said ramp to an object to be ascended with said ramp.

9. The portable folding ramp of claim 1, including at least one support member, fixedly attached to at least one said panel of said ramp and extending a predetermined distance from said lateral sidewall of said at least one panel, for contacting a surface of an object to be ascended with said ramp to support said ramp thereon.

10. The portable folding ramp of claim 1, including a plurality of leg-like extensions attached to said bottom surfaces of selected ones of said panels for supporting said ramp in said second, unfolded state in a substantially horizontal position surface.

11. The portable folding ramp of claim 1, wherein said longitudinal hinge means includes first and second vertical members, each having a distal end and a proximate end, said vertical members being pivotably connected at the proximate ends thereof and each said member having an insert portion extending from said distal ends thereof, said insert portions being slidably positioned in respective first and second slots configured in respective longitudinal sidewalls of adjoining panels connected by said longitudinal hinge means, said insert portion being slidably movable into and out of said slots to selectively adjust the lateral dimension of said ramp when in said second, unfolded state.

12. The portable folding ramp of claim 11 wherein each said insert portion includes a hook portion on the distal end thereof, said hook portions being engageable with the innermost end of, respective slots to restrict said slidable movement of said insert portions in said slot when adjusting the lateral dimension of said ramp.

13. A portable folding ramp, comprising:
first, second, third and fourth rectangular panels, each said panel having a top and bottom surface and lateral and longitudinal sidewalls;
longitudinal hinge means for foldably connecting said first and third panels at adjoining longitudinal sidewalls;
lateral hinge means for foldably connecting said first and second panels and said second and fourth panels at adjoining lateral sidewalls, said panels of said ramp being foldable about said longitudinal and lateral sidewalls into a first state wherein said top surfaces of said panels are substantially parallel with respect to one another, and being unfoldable about said longitudinal and lateral hinge means into a second state wherein said top surfaces of said panels are substantially co-planar with respect to one another;
first and second support brackets, each said support bracket including first and second rigid members, each rigid member of said support brackets being pivotably connected at one end thereof to a respective bottom surface of a respective panel on opposite sides of said lateral hinge means, said first and second rigid members of each said support bracket being further lateral hinge means to form a pivotable V-shaped support extending from said bottom surfaces of panels; and
first and second flexible support cables, each said cable being threaded through apertures in each said first and second rigid member of a respective support bracket, each said cable being fixedly attached at opposite lateral sidewalls of respective adjoining panels to support said ramp by urging said spaced, pivotable connection of each support bracket in a first direction opposite the direction of a load force applied on said top surfaces of said panels.

* * * * *